No. 611,552. Patented Sept. 27, 1898.
A. BALLANTYNE, Dec'd.
M. A. BALLANTYNE, Administratrix.
TENONING MACHINE.
(Application filed Nov. 16, 1897.)

(No Model.) 5 Sheets—Sheet 1.

Witnesses.
A. M. Polley.
A. H. Raynal.

Martha Alice Ballantyne, Administratrix,
By J. A. Osborne & Co.,
Attorneys

No. 611,552. Patented Sept. 27, 1898.
A. BALLANTYNE, Dec'd.
M. A. BALLANTYNE, Administratrix.
TENONING MACHINE.
(Application filed Nov. 16, 1897.)

(No Model.) 5 Sheets—Sheet 3.

Witnesses:
A. M. Polley.
A. H. Raynal.

Martha Alice Ballantyne,
Administratrix,
By J. A. Osborne & Co.
Attorneys.

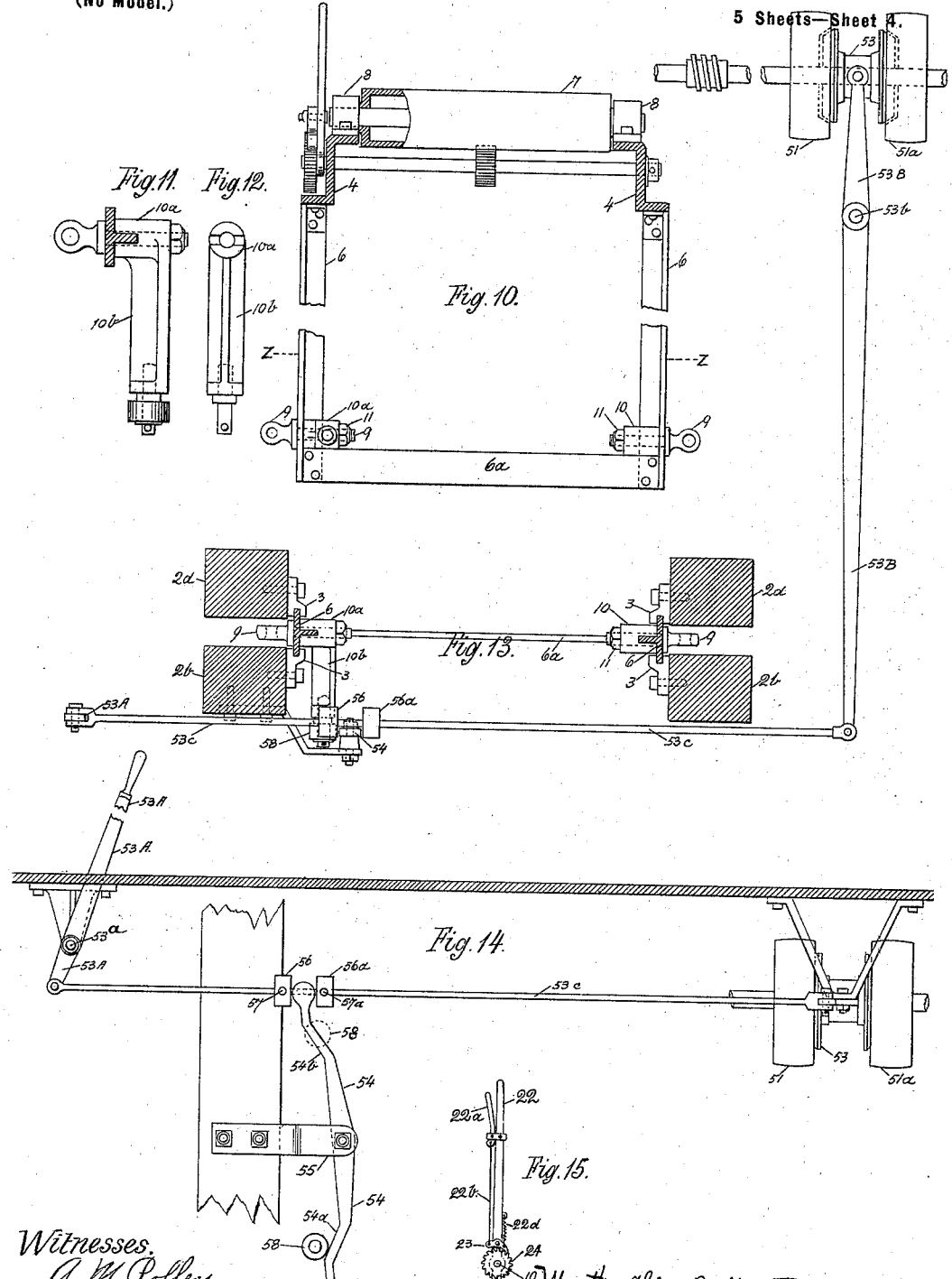

No. 611,552. Patented Sept. 27, 1898.
A. BALLANTYNE, Dec'd.
M. A. BALLANTYNE, Administratrix.
TENONING MACHINE.
(Application filed Nov. 16, 1897.)
(No Model.) 5 Sheets—Sheet 5.
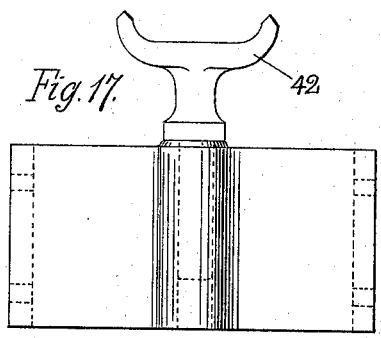
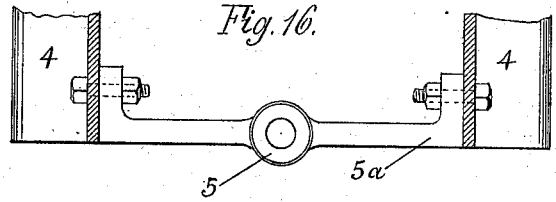
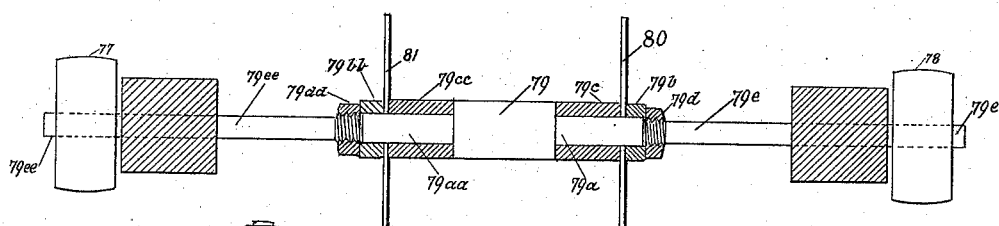
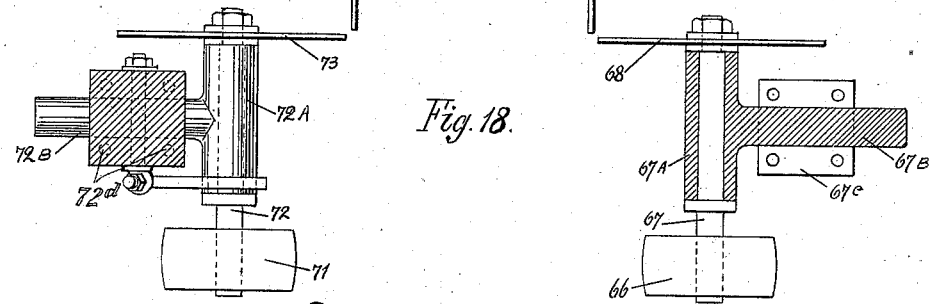
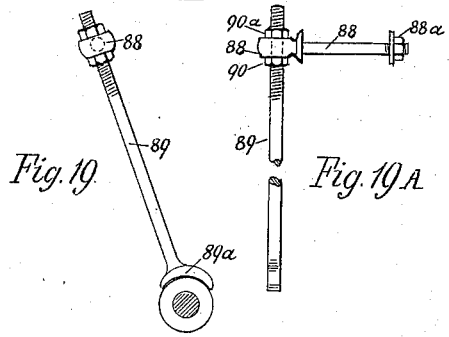
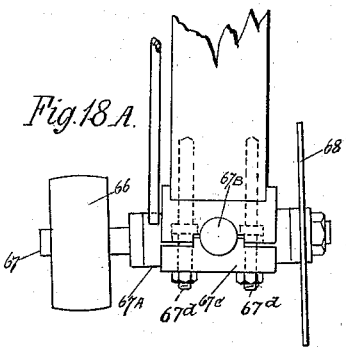
Witnesses.
A. M. Polley
A. H. Raynal
Martha Alice Ballantyne,
Administratrix,
By J. A. Osborne & Co.,
Attorneys.

United States Patent Office.

MARTHA A. BALLANTYNE, OF LEAD, SOUTH DAKOTA, ADMINISTRATRIX OF ALEXANDER BALLANTYNE, DECEASED.

TENONING-MACHINE.

SPECIFICATION forming part of Letters Patent No. 611,552, dated September 27, 1898.

Application filed November 16, 1897. Serial No. 658,711. (No model.)

*To all whom it may concern:*

Be it known that I, MARTHA ALICE BALLANTYNE, a citizen of the United States, residing at Lead, county of Lawrence, South Dakota, as administratrix of the estate of ALEXANDER BALLANTYNE, deceased, do hereby declare that the said ALEXANDER BALLANTYNE, deceased, was the inventor of certain new and useful Improvements in Tenoning-Machines, of which the following is a full, clear, and an exact specification.

The objects of this invention are an improved machine for tenoning logs and beams for mining-timbers, called "square-sets," great compactness in order to occupy small floor-space, great strength, rigidity, and lightness, and improvements in various details that secure ease of manipulation, thereby securing greater economy and more advantages in use than are had with the machines now in use.

Said improvements consist in the several combinations defined in the claims, to which reference is here made for a detailed statement of the invention.

Figure 1:
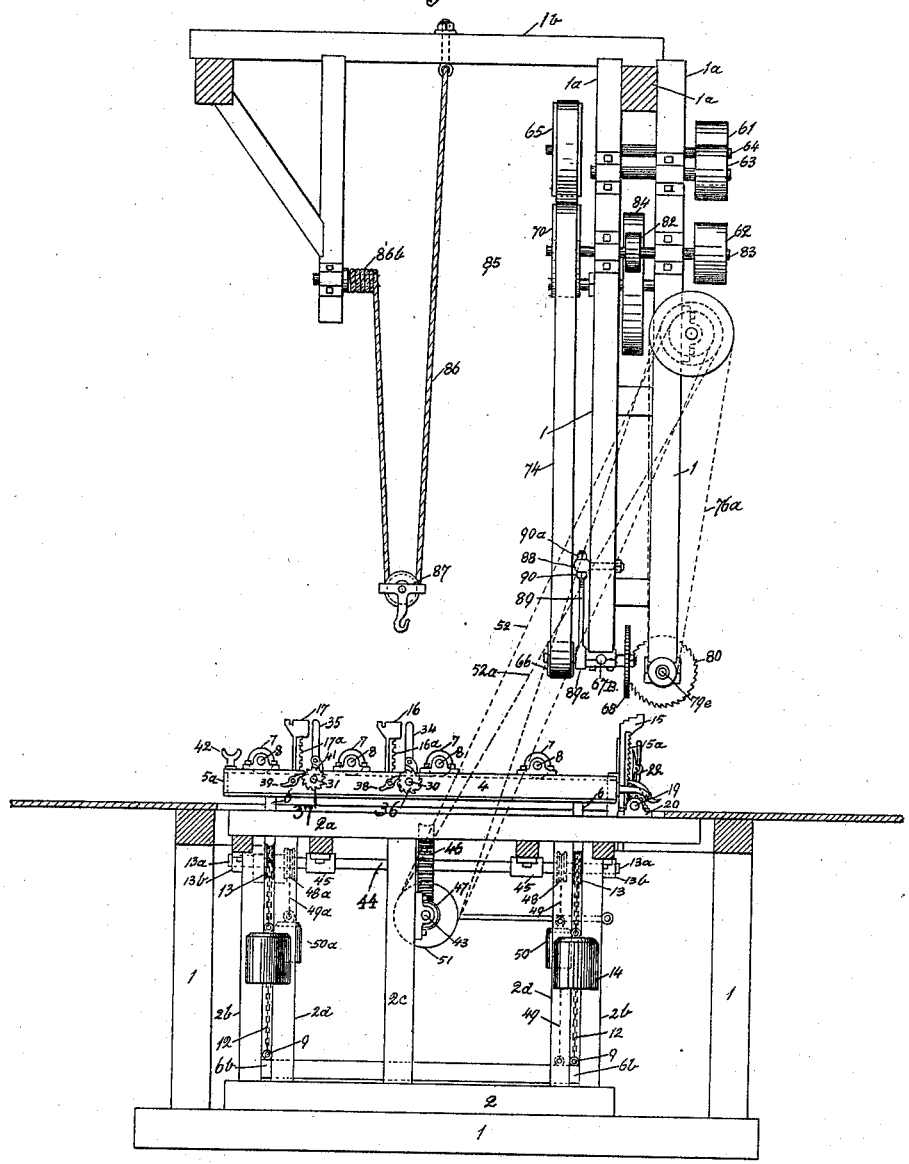
Figure 2:
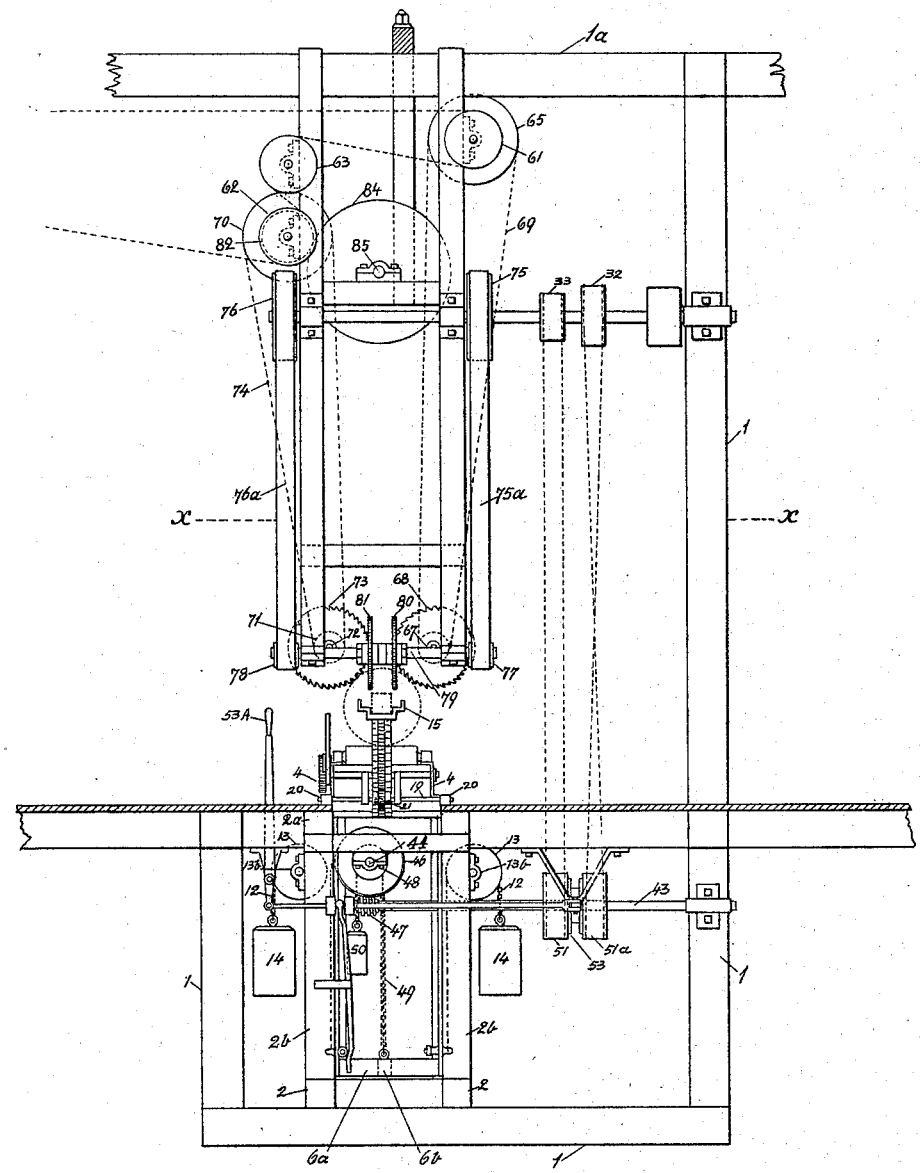
Figure 3:
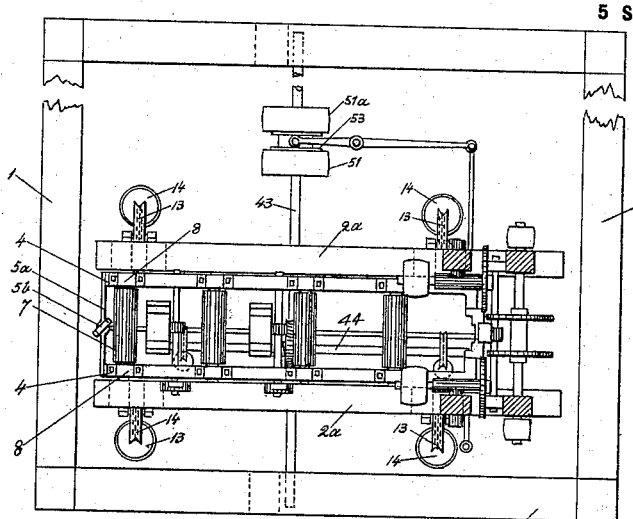
Figure 4:
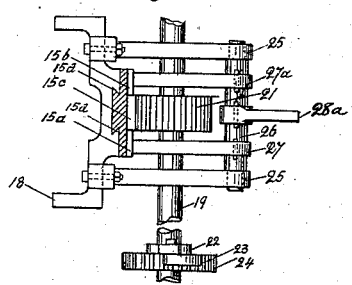
Figure 6:
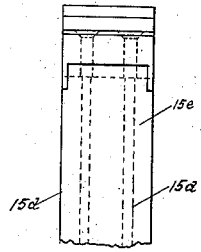
Figure 8:
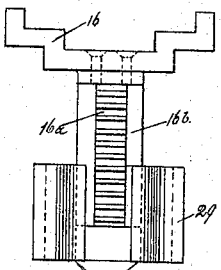
Figure 5:
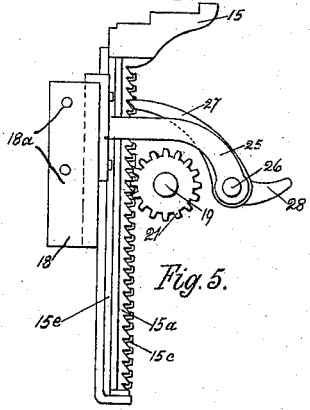
Figure 7:
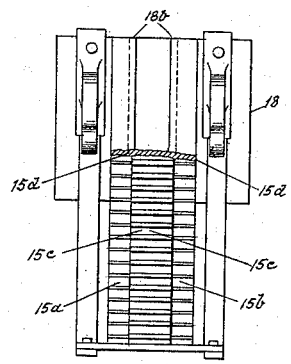
Figure 9:
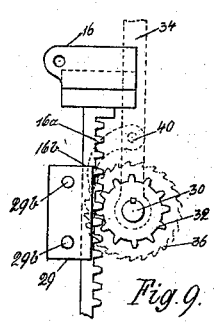

In the accompanying drawings, Figure 1 illustrates a side elevation of said improved tenoning-machine, and Fig. 2 is a front end elevation of the same. Fig. 3 is a sectional view of the overhanging frame at $x x$ in Fig. 2 and shows a top view of the log-carriage. Fig. 4 is a top view of the front end head on the log-carriage, showing its operation by means of a rack and pinion and the dogs and the tripping-lever for releasing the dogs from the ratchets on each side of the rack. Fig. 5 is a side elevation of the parts illustrated in plan in Fig. 4. Fig. 6 is a back view of the rack and ratchet casting. Fig. 7 is a front elevation of the front head and its rack. Fig. 8 is a front view of the back end and the middle log-carriage heads, and Fig. 9 is a side elevation of the same and shows the relation of the ratchet and pawl that operates the pinion that engages the rack attached to the head. Fig. 10 is a cross-sectional view of the main frame and illustrates the log-rollers. Fig. 11 shows the extensible trip-rod that operates the safety device for stopping the machine. Fig. 12 is an end view of the extensible trip-rod. Fig. 13 is a horizontal cross-sectional view of the guides, showing the attached washers, eyebolts for the lifting-chains, guides for the T's, and the safety device for stopping the machine by disengaging the friction-clutches. Fig. 14 is a side elevation of the safety device. Fig. 15 is an elevation of the hand-levers, ratchets, and pawls that operate the pinions that raise and lower the back end and center heads on the carriage. Fig. 16 is a top view of the back end separator of the movable frame and shows the bearing that holds a swiveled yoke that serves as a turntable. Fig. 17 is an end view of the lifting-frame and the swiveled yoke. Fig. 18 is a view, partly in section, illustrating the adjustment of the saws. Fig. 18$^A$ is a side elevation of the bearing that holds the arbor of the crosscut-saws. Fig. 19 is a front elevation of the adjustable brace for keeping the arbor of the crosscut-saws in proper position, and Fig. 19$^A$ is a side elevation of the adjustable brace.

All of the figures from 4 to 19$^A$, inclusive, of the drawings are enlarged from Figs. 1 to 3, inclusive.

In all the figures of the drawings like reference characters refer to like parts.

Said invention combines in its embodiment two general mechanisms that unitedly operate to produce a common result, and it further relates to the details of these mechanisms. The first of these mechanisms is the means employed for holding and manipulating a log or a timber to be operated upon, and the other consists of the saw-operating mechanism. These mechanisms will be described in detail in the order stated.

The mechanism that holds and manipulates the log or timber to be operated upon is seen in side elevation in Fig. 1, in front end elevation in Fig. 2, in top plan in Fig. 3, and enlarged details thereof are illustrated by Figs. 4 to 17, inclusive.

1 is a general frame that incloses the main frame and that supports the overhanging frame of the saw-operating mechanism herein described. The main frame consists of two rectangular frames, one of them, 2, being at the bottom thereof and the other, 2$^a$, at the top thereof, the top of the frame being supported from the bottom by the four corner-posts $2^b$ $2^b$ and two central posts $2^c$ $2^c$. At the inside of the corner-posts are placed uprights $2^d$ $2^d$, leaving a small space between the corner-posts and said uprights. Bolted upon the inner faces of the corner-posts and their adjacent uprights are slides 3 3, in which the guides of the vertically-movable carriage-frame move. The movable carriage-frame consists of two side bars 4 4, Z-shaped, connected by the separators 5 5 and $5^a$. The side bars of the movable frame are secured to the upper ends of four vertical T-guides 6 6, which are connected crosswise at the bottom by two cross-plates $6^a$ $6^a$, that are braced lengthwise of the carriage by the brace $6^b$. The T-guides 6 6 slide in the vertical ways 3 3. Upon the upper side of the carriage are four independent rollers 7 7, that turn in boxes 8 8, fixed upon the upper faces of the Z-bars 4 4. Four eyebolts 9 pass through the T-guides 6 and are secured by means of slotted washers 10, that straddle the T-guides, and nuts 11, that are screwed upon the inner ends of the eyebolts. Connected with the eyebolts are chains 12, that pass over sheaves 13, that are fixed to shafts $13^a$, that turn in boxes $13^b$, that are attached to the main frame near its top. The chains have counterweights 14 attached to their outer ends to balance the movable frame. The combined weight of the counterweights is preferably such as to allow the movable frame, with its load, to descend by gravity.

Fixed to the movable frame are three sliding heads 15, 16, and 17. The front head 15 is forked and stepped, as illustrated, to allow a log or timber to lie thereon, and consists of a casting, Figs. 4 and 5, the lower part of which is composed of two side ratchets $15^a$ and $15^b$ and a central rack $15^c$. The back of the extension $15^e$ of the casting is dovetailed at $15^d$ into ways $18^b$ on the iron separator 18, which is bolted upon the inside of the two Z-bars 4 4 by bolts passing through the holes $18^a$ and the Z-bars. A shaft 19, running in boxes 20 20, bolted on the surrounding stationary main frame, has keyed upon it the pinion 21, which engages the rack $15^c$. The shaft 19 is turned by means of a hand-lever 22, provided with a pawl 23, which when not in use is disengaged from the ratchet-wheel 24, that is keyed upon the shaft 19. On the face of the separator 18 are bolted two brackets 25 25, the extremities of which are provided with bearings for the shaft 26, upon which are keyed two dogs 27 $27^a$, that engage the two ratchets $15^a$ and $15^b$. Keyed upon the shaft 26 between the two dogs is a trip-lever 28. The function of the trip-lever is to disengage the dogs 27 $27^a$ from the ratchets $15^a$ $15^b$.

The two heads 16 and 17 are alike and are similar to the head 15, except that the faces are provided with racks ($16^a$ and $17^a$) only. The extensions $16^b$ and $17^b$ of the heads 16 and 17 move in ways $29^a$, formed in the brackets 29. The brackets 29 are fixed to ties of the Z-bars 4 4 by bolts that pass through the holes $29^b$. Shafts 30 31 pass through the bearings formed in the Z-bars 4 4 and have keyed therein pinions 32 33, that mesh with the racks $16^a$ and $17^a$. The pinion-shafts 30 31 are revolved by means of hand-levers 34 35, similar to the lever 22, that operates the front head. Ratchet-wheels 36 37 are keyed upon the shafts 30 31 outside of the Z-bars on one side. They are held in position by pawls 38 39. Dogs 40 41, pivoted on the levers 34 35, engage the ratchet-wheels 36 37 to turn the rack-pinions 32 33.

At the back end of the movable frame is a separator $5^a$, that has a bearing $5^b$, in which is vertically swiveled the shank of the yoke 42, that serves as a turn-table.

The functions of the heads 15, 16, and 17, with their several racks, pinions, ratchets, pawls, and levers, are to set and line up logs and timbers upon the movable frame. After a tenon shall have been cut upon one end of a log the log may be tipped on a yoke 42 to clear the heads of the movable frame and then turned to cut the tenon upon the opposite end of the log.

After a log shall have been adjusted in position on the heads of the movable frame it is elevated against the saws, hereinafter described, by lifting the movable frame. This is accomplished by power transmitted from any source to the shaft 43. A shaft journaled in boxes 45 45 on the stationary main frame has keyed thereon a gear 46, that is driven by a worm-wheel 47, that is keyed upon the shaft 43. Upon the shaft 44 are keyed two sprocket-wheels 48 $48^a$, over each of which passes a chain 49 $49^a$, one end of which carries weights 50 $50^a$, the other ends being attached to the cross-piece $6^b$ of the movable frame. As the shaft 44 is turned in one direction or the other from the shaft 43 through the worm 47 and gear 46 the movable frame, with its load, is lifted by the chains 49 $49^a$ or allowed to lower by gravity.

Power is transmitted to the shaft 43 through the pulleys 51 $51^a$ from the belts indicated by the dotted lines 52 $52^a$. The pulleys 51 $51^a$ are fixed upon the shaft 43. A friction-clutch 53 has movement longitudinally on the shaft, so that it may be thrown into contact with the pulleys 51 and $51^a$, located at each side of the clutch. One of said belts is crossed to turn the shaft in one direction, and the other is straight to turn the shaft in the opposite direction. The details of the clutch mechanism are not illustrated or described, for the reason that any suitable known form of clutch may be employed. The clutch mechanism is operated by hand by means of the hand-lever $53^A$, pivoted at $53^a$, the pivoted clutch-lever $53^B$, pivoted at $53^b$, and the intermediate connecting-link $53^c$. Any convenient lever and its placement and arrangement may be used to operate the clutch.

To the main stationary frame a safety device is attached that limits the vertical movement of the movable frame. A lever 54, bent at both ends, as shown in Fig. 14, is pivoted at its center to a bracket 55, that is attached to the main frame. The upper end of the lever 54 rests between the two collars 56 $56^a$, that are fastened upon the intermediate connecting-link $53^c$ by set-screws 57 $57^a$. One of the washers $10^a$ that straddles one of the T-guides to hold one of the eyebolts 9 is provided with an extension $10^b$, Fig. 13, the extremity of which is turned to receive a roller 58. This roller is in contact with the lever 54 during the ascent and descent of the movable frame and its T-guides. The engagement of one of the inclines $54^a$ of the lever 54 with the roller swings the lever over to move the intermediate connecting-link $53^c$ and throws the clutch 53 out of engagement with the pulley $51^a$, and the engagement of the opposite incline $54^b$ with the roller 58 swings the lever to the opposite direction and moves the intermediate connecting-link $53^c$ oppositely to disengage the clutch from the pulley 51. Figs. 11, 12, 13, and 14 illustrate the details of the safety device. When the movement of the movable frame either upward or downward shall have been stopped by disengaging the clutch 53 from one or the other of the driving-pulleys 51 or $51^a$, the connecting-link $53^c$ is moved by hand through the lever $53^A$, suitably disposed to throw the clutch into engagement with the opposite drive-pulley. As any known means may be used for shifting the clutch 53 in either direction, the means illustrated is not further described.

Fig. 15 is an enlarged detail of the lever 22, in which $22^a$ is a pivoted hand-lever that is connected by the rod $22^b$ with the pivoted dog 23. Pressure on the lever $22^a$ throws the dog into engagement with the ratchet 24, and upon release of the lever $22^a$ the spring $22^d$ disengages the dog from the ratchet.

$1^a$ $1^b$ constitute an overhanging framework that carries the combination of saws and the pulleys and shafting through which the saws are operated. 61 and 62 are intermediate pulleys, and 63 is an idler. Upon the same shaft 64 with the pulley 61 is a pulley 65, which drives the pulley 66 upon the spindle 67, upon which is fastened one of the crosscut-saws 68. 69 is a belt from pulley 65 to pulley 66. In the same manner a pulley 70 drives the pulley 71 upon the spindle 72, attached to which is a crosscut-saw 73. 74 is a belt from the pulley 70 to the pulley 71. The pulleys 75 and 76 through the belts $75^a$ and $76^a$ drive the pulleys 77 and 78, mounted upon the spindle 79, on which are adjusted the rip-saws 80 and 81. A friction-gear 82 on the shaft 83, upon which are fixed the pulleys 62 and 70, engages the friction-gear 84, that is fixed upon the shaft 85. A fall 86 has one end attached to the shaft 85 and its other end attached to the overhead beam $1^b$. The fall will wind on the shaft 85, as at $86^b$, or a drum may be placed upon the shaft, upon which drum the fall may wind. The fall carries a block 87, that hangs above the movable carriage-frame, hereinbefore described. Logs are lifted onto and from the carriage by means of the fall 86 and its block 87.

The operation of the said machine is manifest from the foregoing description. The carriage is lowered by throwing the friction-clutch 53 into contact with the pulley $51^a$. When the roller 58 comes into contact with the lower incline $54^a$ of the lever 54, the shaft 43 is thrown to the left and the clutch disengaged, thus stopping the movable carriage at the bottom of its travel. When the carriage is at its lowest position, the heads on the carriage are lowered and the log is placed thereon. The heads are then raised by means of their levers, ratchets, and pawls and the log adjusted with its axis horizontal. The movable frame is then raised by throwing the clutch 53 into contact with the pulley 51. This raises the log against the overhanging crosscut and rip saws to make the first series of cuts by the four saws. The frame is then lowered, the log turned over a quarter-turn, and the frame is again raised to make the second cut to complete the tenon on one end of the log. When the roller 58 reaches the incline $54^b$, the shaft 43 is moved to the right to clear the clutch of the pulley 51. This automatically stops the carriage at its upper limit of travel. To tenon the opposite end of the log, the movable frame is lowered, the log is tipped on the yoke or turn-table 42 to clear the heads, and the log is then turned by swinging it around. The lining up of the log and the tenoning of that end is a repetition of the work of tenoning the opposite end. Any length of timber can be tenoned.

The construction of the spindle that carries the rip-saws and the means provided for adjusting the crosscut-saws are illustrated by Fig. 18. The spindle 79 is reduced in size from a central part, as at $79^a$ $79^{aa}$, upon which reduced parts are fitted the rip-saws 80 and 81, held in place by the washers $79^b$ $79^{bb}$ and $79^c$ $79^{cc}$, that are secured by the nuts $79^d$ $79^{dd}$. The turned ends $79^e$ $79^{ee}$ receive the pulleys 77 and 78. The means provided for the adjustment of the rip-saws 80 81 on the spindle to cut the tenons of different sizes is secured by providing different sizes of washers. To provide for the adjustment of the crosscut-saws 68 and 73, the spindles 67 and 72 of said saws turn in bearings $67^A$ and $72^A$, that are provided with arms $67^B$ and $72^B$, that are at right angles to the bearings. The arms are clamped in boxes $67^C$ and $72^C$. The bearings $67^A$ and $72^A$ are supported by their arms $67^B$ and $72^B$. Lateral adjustment of the crosscut-saws is had by moving said arms $67^B$ and $72^B$ in their boxes, and the adjustment is secured by clamping the arms tightly in the boxes by means of the bolts 67$^d$ and 72$^d$.

It is important to keep the crosscut-saws 68 and 73 in a perpendicular plane. To accomplish this, the device illustrated by Figs. 19 and 19$^A$ is employed. Its position in the overhanging framework is shown in Fig. 1. 88 is an eyebolt that passes through one of the timbers of the overhanging frame and is secured in place by the nut 88$^a$. The screw-threaded bar 89 passes loosely through the eye of the eyebolt 88 and is fixed in position by the two nuts 90 90$^a$. The lower end of the bar 89 has a curved shoulder 89$^a$, which rests against the bearing 67$^A$ of the spindle 72. This forms a vertically-adjustable brace for the spindles of the crosscut-saws and provides for alining said saws vertically. The arbor-boxes of these saws are pivoted to allow alinement of the saws. A like device is provided for each of the crosscut-saws; but only one of them shows in the drawings.

What is claimed, and desired to be secured by Letters Patent, is—

1. The combination, in a tenoning-machine, of vertical rip-saws; means for lateral adjustment of the rip-saws; vertical crosscut-saws; means for vertical alinement and lateral adjustment of the crosscut-saws; driving mechanism for said saws; a vertically-movable carriage-frame carrying adjustable heads for leveling and supporting a stick of timber thereon; a vertically-swiveled yoke carried by the movable frame to reverse the timbers thereon; and a throw-off that limits the upward and downward movement of the carriage-frame, substantially as described.

2. The combination, in a tenoning-machine, of a carriage-frame having vertical movement; movable heads carried by the carriage-frame; a vertically-swiveled yoke carried by the carriage for reversing a timber thereon; a throw-off to limit the upward and downward movement of the carriage; and a fixed overhanging frame that carries the saw mechanism, said saw mechanism embodying vertical rip-saws; means to give the rip-saws lateral adjustment; crosscut-saws, means for alining the crosscut-saws to a vertical plane, and means for adjusting the crosscut-saws laterally to the rip-saws, substantially as described.

3. In a tenoning-machine, a main frame; a carriage-frame inclosed within the main frame and having vertical movement therein; reversible driving mechanism for moving the carriage up and down; movable heads on the carriage for lining up timbers thereon, and a vertically-swiveled yoke for reversing timbers on the carriage, substantially as described.

4. In a tenoning-machine, a main frame provided with guideways; a carriage-frame having vertical movement in said guideways; counterweights for the carriage-frame; movable heads carried by the carriage-frame for lining up logs thereon, and reversible driving mechanism for moving said carriage, substantially as described.

5. In a tenoning-machine, a main frame; a carriage-frame having movement vertically of the main frame; vertically-adjustable heads carried by the carriage-frame, and reversible driving mechanism for moving the carriage-frame up and down, substantially as described.

6. In a tenoning-machine, a vertically-movable carriage-frame; guides for the carriage-frame; vertically-adjustable heads upon the carriage-frame, and reversible driving mechanism for operating the carriage-frame, substantially as described.

7. In a tenoning-machine, a main frame provided with guideways; a carriage-frame adapted to move vertically in said guideways; movable heads carried by the carriage-frame for lining up logs thereon; a driving-shaft provided with reverse driving-pulleys and clutch mechanism; a lever pivoted centrally thereof to the main frame and having bends at its ends, said lever being in operative engagement through an intermediate connecting-link and friction-clutches with the driving-shaft, and an arm carried by the carriage-frame to give the said pivoted lever a rocking movement to reverse the driving mechanism, substantially as described.

8. In a tenoning-machine, a vertically-movable carriage-frame; guides for the carriage-frame; vertically-adjustable heads upon the carriage-frame; reversible driving mechanism for operating the carriage-frame, and a safety device to limit the upward and downward movement of the carriage-frame, substantially as described.

MARTHA A. BALLANTYNE,
*Administratrix of the estate of Alexander Ballantyne, deceased.*

Witnesses:
R. H. DRISCOLL,
MASON TYLER.